(12) United States Patent
Brokelmann

(10) Patent No.: US 8,148,974 B2
(45) Date of Patent: Apr. 3, 2012

(54) PULSE GENERATOR WHEEL, PREFERABLY FOR SHAFTS, AND METHOD FOR MANUFACTURING SUCH A PULSE GENERATOR WHEEL

(75) Inventor: Thomas Brokelmann, Neuenstadt (DE)

(73) Assignee: KACO GmbH & Co. KG, Heilbronn (DE)

( * ) Notice: Subject to any disclaimer, the term of this patent is extended or adjusted under 35 U.S.C. 154(b) by 912 days.

(21) Appl. No.: 12/111,207

(22) Filed: Apr. 29, 2008

(65) Prior Publication Data

US 2008/0272769 A1 Nov. 6, 2008

(30) Foreign Application Priority Data

May 2, 2007 (DE) .......................... 10 2007 021 421

(51) Int. Cl.
*G01B 7/30* (2006.01)
(52) U.S. Cl. .............. 324/207.25; 324/207.22; 324/166; 324/175; 324/173; 324/178; 324/179

(58) Field of Classification Search ............. 324/207.22, 324/207.25, 166, 175, 173, 178, 179
See application file for complete search history.

(56) References Cited

U.S. PATENT DOCUMENTS

2002/0125882 A1 * 9/2002 Foster et al. .................. 324/174
2003/0122539 A1 * 7/2003 Heimann et al. .............. 324/173

* cited by examiner

*Primary Examiner* — Huy Q Phan
*Assistant Examiner* — Son Le
(74) *Attorney, Agent, or Firm* — Gudrun E. Huckett

(57) ABSTRACT

A pulse generator wheel has a cylindrical wall provided with windows distributed about a circumference of the cylindrical wall and closed axially at a first end by a ring. The ring is made of circumferentially extending profiled sections of profiled parts that are separated from one another. The pulse generator wheel is made by stamping in a round sheet metal about the circumference profiled parts each having at least one profiled section extending in the circumferential direction for forming windows between the profiled parts. The profiled sections are spaced from one another in the circumferential direction. The profiled parts are erected and the profiled sections then form a circumferential ring delimiting the windows axially.

10 Claims, 4 Drawing Sheets

PULSE GENERATOR WHEEL, PREFERABLY FOR SHAFTS, AND METHOD FOR MANUFACTURING SUCH A PULSE GENERATOR WHEEL

BACKGROUND OF THE INVENTION

The invention relates to a pulse generator wheel, preferably for shafts, comprising a circumferential cylindrical wall that is provided with windows that are distributed about the circumference of the cylindrical wall and that are closed axially by a ring.

Pulse generator wheels are used in combination with sensors for measuring the rotary speed and angle position, for example, in motors. The pulse generator wheels have a substantially cylindrical wall with recesses.

As a result of the fixed connection to the shaft, the recesses move past a sensor when the shaft is being rotated and this causes a change of the magnetic flux of the magnets provided in the sensor. These changes are detected by a measuring cell in the sensor and converted into corresponding electrical pulses.

Pulse generator wheels are known whose cylindrical wall is profiled in a wave shape. This wave-shaped profile provides a robust configuration of the pulse generator wheel. Disadvantageous is however the resulting imprecision of the measured result. Depending on the maximum allowable outer diameter there are conflicts with the fit bore that is provided at the bottom side.

Other pulse generator wheels are known in which the wall is formed by fingers that are positioned adjacent to one another at a spacing. Between the fingers the windows are formed that are open in the axial direction. This finger profile has a higher precision in comparison to the wave-shaped profile. Because of the individual fingers, the pulse generator wheel is however very sensitive with regard to mechanical damages or deformations after its manufacture. The fingers are relatively narrow and can therefore easily become bent so that the measuring precision is impaired.

Also, pulse generator wheels are known in which the cylindrical wall has windows that are rectangular recesses within the wall. In contrast to the finger profile, the windows are closed off in the axial direction by a circumferential ring. This ring provides stabilization of the pulse generator wheel. This webs extending between the windows are thus essentially protected with regard to deformation. However, the manufacture of the window profiles is possible only with great expenditure. Also, the precision required for the pulse generator wheels can be achieved only with difficulty. A further problem resides in that the windows are first stamped from a flat sheet metal part. The edge area that contains the windows must then be erected. This erecting process however causes the diameter of the ring that closes off the windows axially to become smaller so that material displacement occurs. This has the result that the outer ring is of an irregular shape and this impairs the precision of measurements carried out with the pulse generator wheel.

SUMMARY OF THE INVENTION

It is an object of the present invention to configure the pulse generator wheel and the method of the aforementioned kind in such a way that a simple manufacture allows the pulse generator wheel to be produced with high precision.

In accordance with the present invention, this is achieved in regard to the pulse generator wheel in that the ring is formed by circumferentially extending profiled sections of separate profiled parts. In accordance with the present invention, this is furthermore achieved in regard to the method for manufacturing in that for forming the windows profiled parts having at least one circumferentially extending profiled section are stamped along the circumference of the sheet metal such that the profiled sections have a spacing from one another, and the profiled parts are subsequently erected and the profiled sections form a circumferential ring.

In the pulse generator wheel according to the invention, the windows are delimited by separated profiled parts. These profiled parts have the circumferentially extending profiled sections that form the circumferential ring delimiting the windows axially in the pulse generator wheel. The individual profiled parts can be erected without problems after the stamping process for forming the wall.

Since the profiled parts are separate from one another, their profiled sections extending in the circumferential direction are also separate from one another. The profiled sections have such a length that after stamping they have a spacing from one another in the flat sheet metal. When the profiled parts are erected, their profiled sections come to rest against one another so that the substantially closed ring structure is formed. A material displacement, as in the case of a closed continuous ring, is avoided so that the ring after erection of the profiled parts has a substantially uniform round shape.

In the method according to the invention first the windows are formed at the circumference of the flat sheet metal in that the profiled parts are stamped along the sheet metal edge. The profiled parts are designed such that the profiled sections extending in the circumferential direction of the sheet metal edge are spaced from one another. The spacing is selected such that the profiled sections after erection of the profiled parts form the circumferentially extending ring. With this method, pulse generator wheels having high precision can be produced by means of a simple manufacturing process without problems. The windows or the profiles parts can have different shapes and/or different spacings from one another. For example, different shapes of the profile parts can be provided.

DESCRIPTION OF THE PREFERRED EMBODIMENTS

Figure 1:
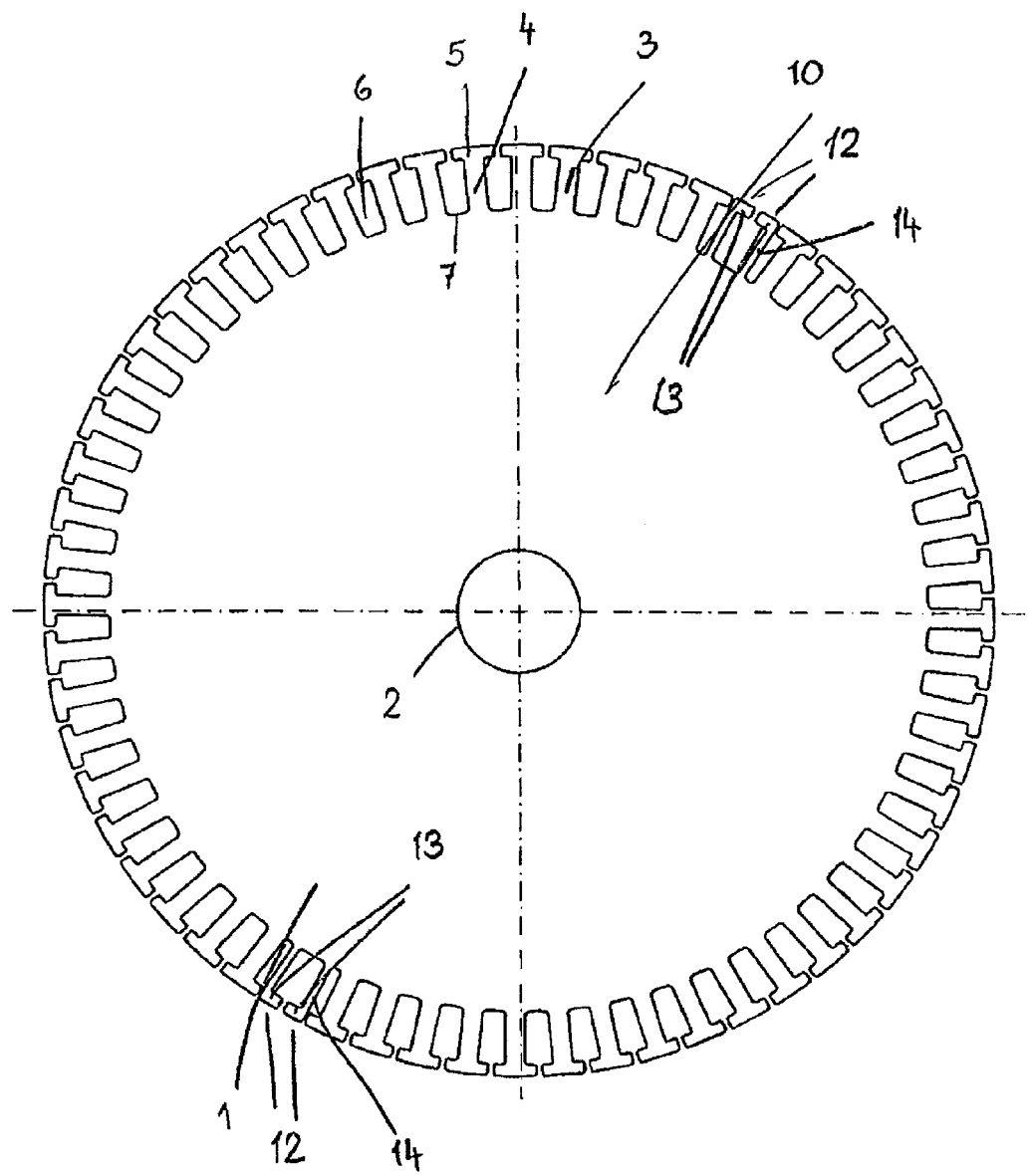
FIG. 1 shows a stamped sheet metal for producing a pulse generator wheel.

In order to monitor rotary speed and/or angle positions and similar parameters of shafts, pulse generator wheels are used that are made primarily from ferromagnetic material. In the embodiment according to FIGS. 1 to 3, as a starting material for a ferromagnetic pulse generator wheel a ferromagnetic sheet metal 1 is used that has initially a circular contour. This sheet metal is for example stamped by a stage tool in a stamping press from a sheet metal web. The sheet metal 1 is centrally provided with a circular opening 2. On the outer circumference of the sheet metal 1 a stamping action is carried out in such a way that the T-shaped parts 3 are formed whose legs 4 extend radially away from the base member of the sheet metal 1 and at the free end are provided with perpendicularly positioned stays 5 that form the circumferentially extending profiled sections. The T-shaped parts 3 are identical and are arranged at a uniform spacing about the circumference of the flat sheet metal 1. The stays 5 of neighboring T-shaped parts 3 are spaced from one another in the flat sheet metal 1. Between the legs 4 of the T-shaped parts approximately rectangular windows 6 are formed that are delimited radially inwardly by the base member of the sheet metal 1 and radially outwardly by the stays 5.

Figure 2:
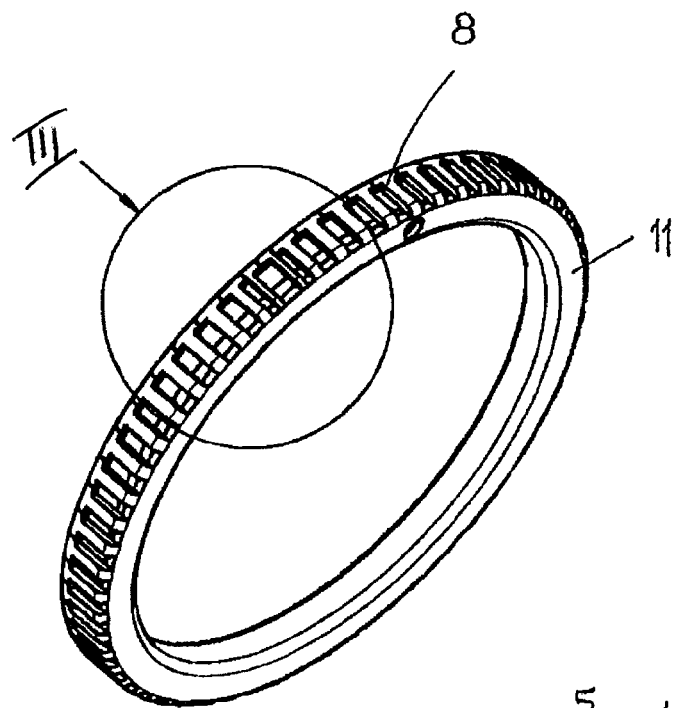
FIG. 2 is a perspective illustration of a pulse generator wheel produced from the stamped sheet metal according to FIG. 1.
Figure 3:
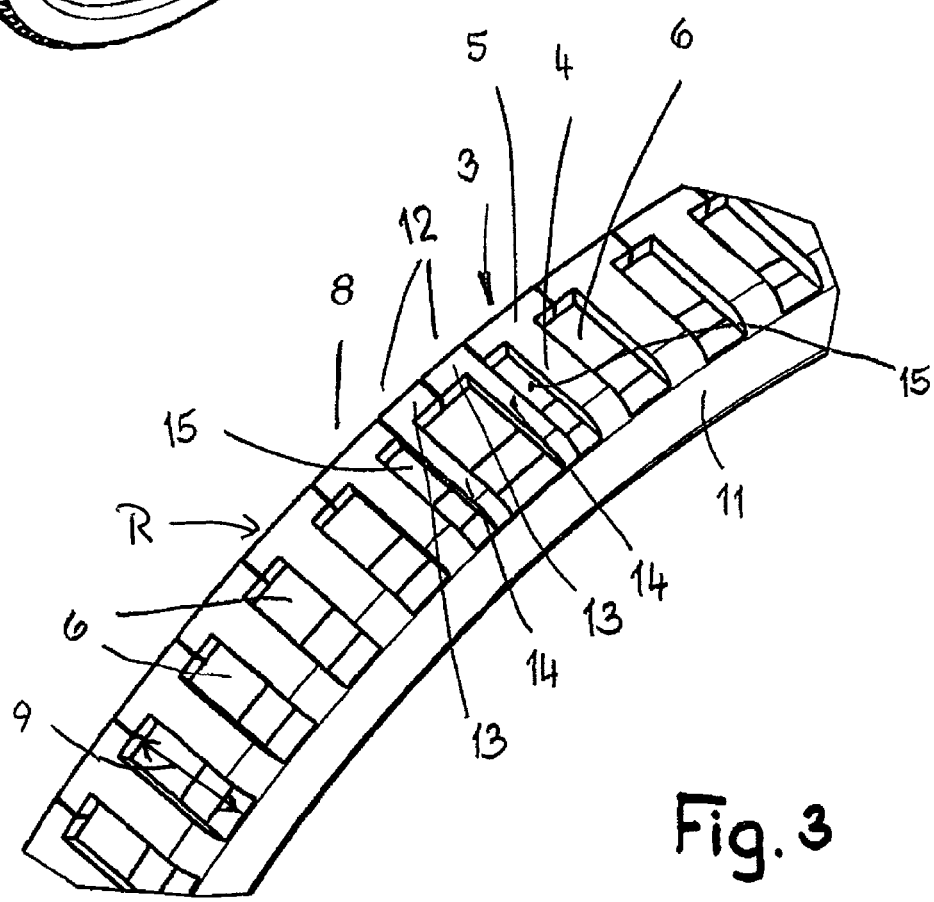
FIG. 3 shows detail III of FIG. 2.

For producing the pulse generator wheel the T-shaped parts 3 are bent at a right angle approximately at the base 7 of the legs 4. In this way, a circumferentially extending cylindrical wall 8 is formed (FIGS. 2 and 3) that is provided about its circumference with uniformly distributed windows 6. As a result of the bending process of the T-shaped parts 3 the stays 5 of neighboring T-shaped parts 3 contact one another (FIG. 3). In this way, a continuous ring R is formed that imparts to the pulse generator wheel and its wall 8 a satisfactory stiffness and stabilization. The central area 10 (FIG. 1) is stamped subsequently from the sheet metal body such that only a narrow ring 11 remains that is positioned in a radial plane of the pulse generator wheel. This central area 10 can be stamped out after erecting the T-shaped parts 3 but can also be stamped out of the flat sheet metal 1 that is shown in FIG. 1.

With the described method it is possible in a simple way to produce the windows 6 or the teeth of the pulse generator wheel formed by the T-shaped parts 3. About the circumference of the sheet metal 1, the profiled parts can also be differently designed and/or can have a different spacing from one another. FIG. 1 illustrates in an exemplary fashion that at two diametrically opposed locations instead of the T-shaped parts 3 two L-shaped parts 12 are provided, respectively, whose short legs 13 are pointing toward one another and form the circumferentially extending profiled sections. The longer legs 14 that project radially from the base member of the sheet metal 1 will extend axially in the pulse generator wheel to be produced. The short legs 13 have such a spacing from one another that they contact one another when the L-shaped parts 12 are erected. The radially extending long legs 14 in the stamped sheet metal have such a spacing from the stay 5 of the neighboring T-shaped parts 3, respectively, that the legs 14 in the erected position at their free end rest against the neighboring end of the stay 5 of the corresponding T-shaped part (FIG. 3). The short legs 13 are positioned at the same level as the stays 5 of the T-shaped parts 3. The long legs 14 of the L-shaped parts 12 define together with the neighboring legs 4 of the T-shaped parts 3 windows 15 that have the same axial length 9 in the pulse generator wheel as the windows 6 but are substantially narrower than the windows 6 in the circumferential direction.

In this way, on the circumferential cylindrical wall 8 of the pulse generator wheel differently designed windows and/or teeth can be provided, depending on the application or use of the pulse generator wheel. The differently designed teeth can be used e.g. also as indexing grooves.

Figure 4:
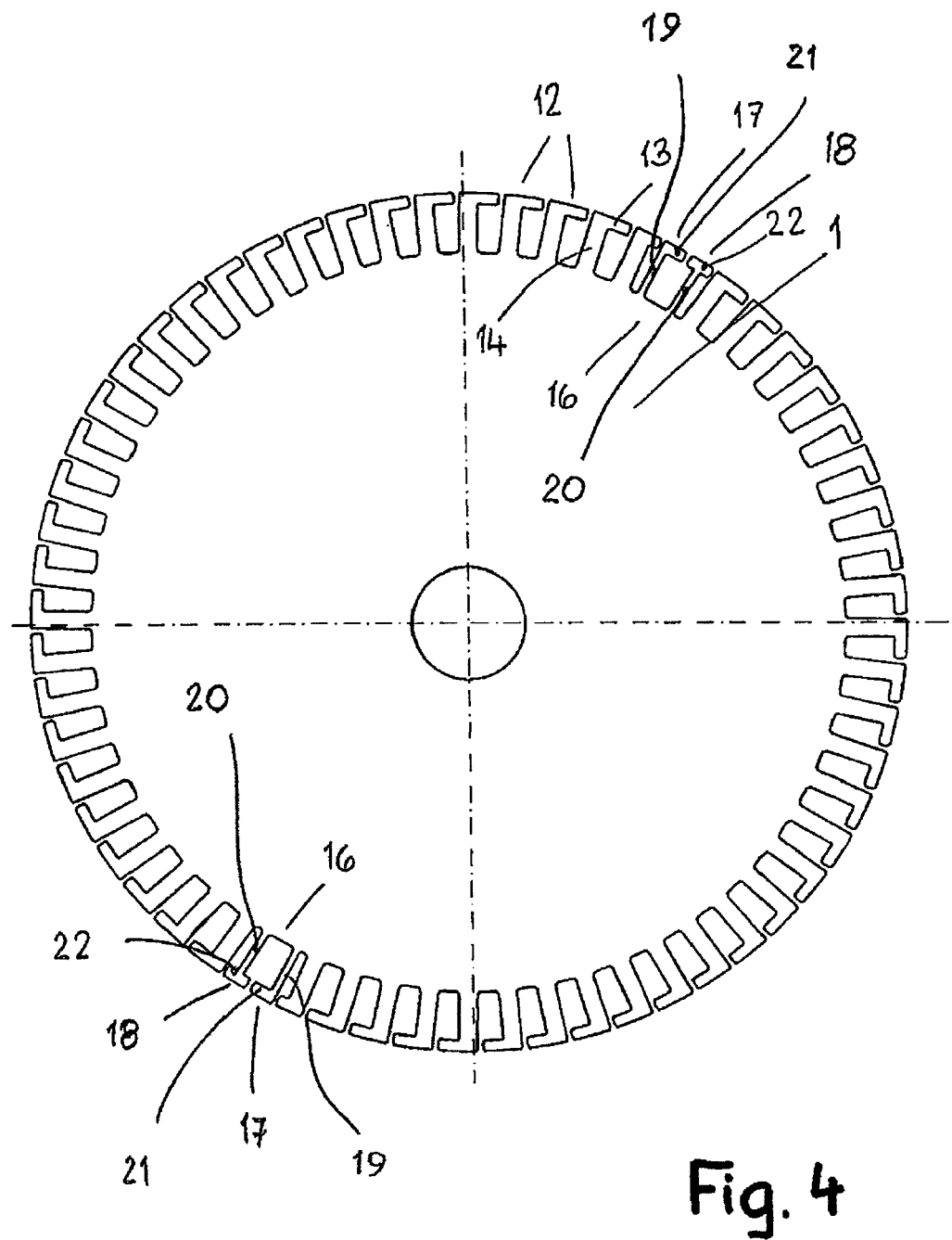
FIG. 4 shows a stamped sheet metal for producing a pulse generator wheel of a second embodiment.
Figure 5:
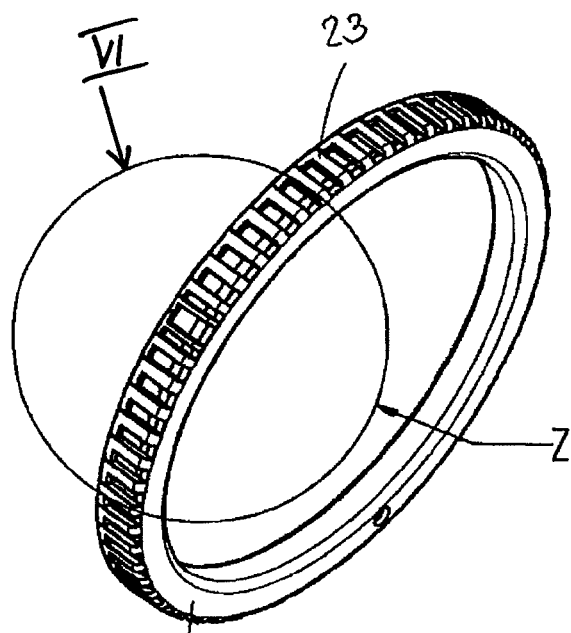
FIG. 5 is a perspective illustration of a pulse generator wheel produced from the stamped sheet metal according to FIG. 4.
Figure 6:
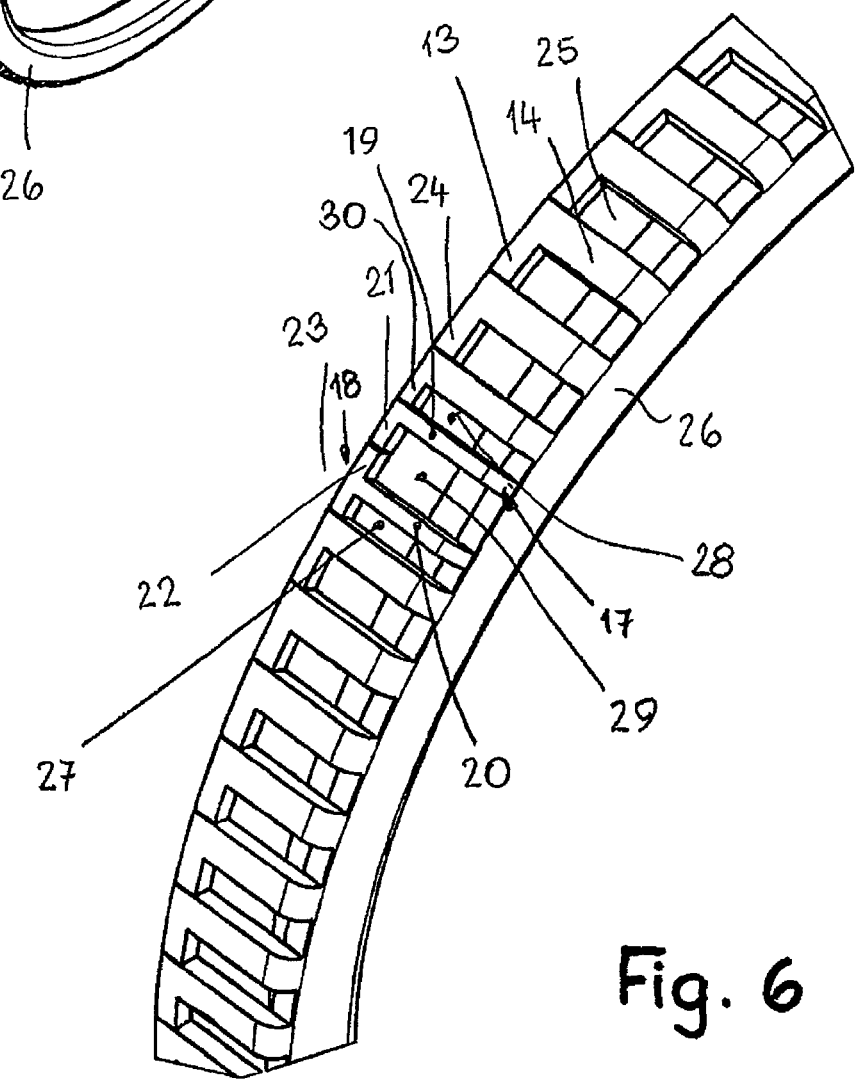
FIG. 6 shows detail VI of FIG. 5.

In the embodiment according to FIGS. 4 to 6, along the edge of the ring-shaped flat sheet metal 1 L-shaped parts 12 are stamped wherein the short legs 13 forming the circumferentially extending profiled sections all point in the same directions. At two diametrically opposed locations differently designed shaped parts are provided. At the locations 16 an L-shaped part 17 and a T-shaped part 18 are positioned opposite one another. The L-shaped part 17 has a radially extending leg 19 in the sheet metal that is narrower than the long leg 14 of the L-shaped parts 12. The T-shaped part 18 has a narrow leg 20 that is approximately of the same width as the leg 19. The short leg 21 (circumferentially extending profiled section) of the L-shaped part 17 is positioned at a spacing opposite the stay 22 (circumferentially extending profiled section) of the T-shaped part 18. The other L-shaped parts 12 on the circumference of the flat sheet metal 1 are identical relative to one another. In accordance with the preceding embodiment, the profiled parts are erected by bending about 90 degrees so that a cylindrical wall 23 is formed. When erecting the profiled parts, the spacing between the legs 13, 21 and the stays 22 (circumferentially extending profiled sections) is reduced to zero so that they can rest against one another. In this way, the wall 23 is provided with a circumferentially closed ring 24 comprised of the legs 13, 21 and the stays 22 that provides to the pulse generator wheel a great stiffness and stability. In the pulse generator wheel, neighboring L-shaped parts 12 delimit rectangular windows 25 that are delimited axially at one end by ring 26 (FIG. 5 and 6), axially at the opposite end by the legs 13, 21, and the stays 22 of the different parts 12, 17, 18, and in the circumferentially direction by the long leg 14 of the L-shaped part 12.

In the area of the L-shaped parts 17 and the T-shaped parts 18 windows 27 to 29 are provided; the window 27, 28 have the same width in the circumferentially direction; they are narrower than the windows 25. The window 27 is axially delimited at one end by the ring 26 and axially at the opposite end by a part of the stay 22 of the T-shaped part 18. The window 28 is axially delimited at one end by the ring 26, axially at the opposite end by a short leg 30 that is shorter than the leg 13 of the L-shaped parts 12. The window 29 is axially delimited at one end by the ring 26 and axially at the opposite end by a part of the stay 22 of the T-shaped part 18 and the short leg 21 of the L-shaped part 17. In the circumferentially direction all windows are delimited by the legs 14, 19 and 20 of the L-shaped parts 12,17 and the T-shaped parts 18 of the pulse generator wheel which legs 14, 19, 20 extend in the axial direction.

As in the preceding embodiment, for forming the ring 26 the flat sheet metal 1 can be stamped appropriately. However, it is also possible to carry out this stamping process after the profiled parts along the edge of the sheet metal have been erected by being bent about 90 degrees.

In this embodiment, the teeth can also have different shapes and/or spacing along the circumference of the pulse generator wheel. The teeth can be of different design within the cylindrical wall 23.

The embodiments of the teeth and the windows arranged therebetween of the pulse generator wheel as disclosed in connection with FIGS. 1 through 6 are to be understood as examples only. They can have designs or shapes different from the illustrated examples.

In all afore described embodiments the shaped parts after the stamping process of the flat sheet metal 1 have a spacing from one another. When erecting them for forming a cylindrical wall 8, 23 this spacing is bridged in such a way that the legs and webs for forming a closed ring 9, 24 rest against one another. The profiled parts 3, 12, 17, 18 can be produced with high precision in a simple way. Because the profile parts after stamping have a spacing from one another in the sheet metal 1 they can be erected without problems by being bent about 90 degrees. In this way, with regard to observing precise dimensions, a precise cylindrical wall 8, 23 can be produced. The ring R, 24 that forms a stabilization ring after erection of the profiled parts is uniform and has a constant diameter.

The pulse generator wheel is connected for example fixedly to a shaft. The windows 6, 15, 25, 27 to 29 move upon rotation of the shaft past a sensor thus causing changes of the magnetic flux in magnets provided within the sensor. The changes are detected by a measuring cell of the sensor and converted into corresponding electrical pulses. Based on the pulses, the rotary speed and/or the angle position of the shaft can be precisely measured. Such pulse generator wheels are, for example, employed in sealing systems where detection of the crankshaft speed and crankshaft angle of motor vehicles are required.

The specification incorporates by reference the entire disclosure of German priority document 10 2007 021 421.0 having a filing date of May 2, 2007.

While specific embodiments of the invention have been shown and described in detail to illustrate the inventive principles, it will be understood that the invention may be embodied otherwise without departing from such principles.

What is claimed is:

1. A pulse generator wheel comprising:
   a cylindrical wall provided with windows distributed about a circumference of the cylindrical wall and closed axially at a first end by a ring, wherein the ring consists of circumferentially extending profiled sections of profiled parts that are separated from one another;
   wherein the profiled sections have free ends resting against neighboring ones of the profiled sections of the profiled parts, respectively.

2. The pulse generator wheel according to claim 1, wherein the profiled parts have a T-shape.

3. The pulse generator wheel according to claim 1, wherein the profiled parts have an L-shape.

4. The pulse generator wheel according to claim 1, wherein the profiled parts in the cylindrical wall have the same shape and the same spacing from one another.

5. The pulse generator wheel according to claim 1, wherein the profiled parts in the cylindrical wall have the same shape.

6. The pulse generator wheel according to claim 1, wherein the profiled parts in the cylindrical wall have the same spacing from one another.

7. The pulse generator wheel according to claim 1, wherein the profiled parts in the cylindrical wall are differently designed.

8. The pulse generator wheel according to claim 1, wherein the profiled parts in the circumferential wall are differently spaced from one another.

9. The pulse generator wheel according to claim 1, wherein the profiled parts in the cylindrical wall are differently designed and differently spaced from one another.

10. A method for producing a pulse generator wheel according to claim 1, comprising the steps of:
    stamping in a round sheet metal about the circumference profiled parts each having at least one profiled section extending in the circumferential direction for forming windows between the profiled parts, wherein the profiled sections are separated from one another in the circumferential direction;
    erecting the profiled parts so that the profiled sections form a circumferential ring, wherein the profiled sections have free ends resting against neighboring ones of the profiled sections or neighboring ones of the profile parts, respectively, in the circumferential ring.

\* \* \* \* \*